US009341485B1

(12) United States Patent
Weiland et al.

(10) Patent No.: US 9,341,485 B1
(45) Date of Patent: May 17, 2016

(54) METHOD AND APPARATUS FOR REPRESENTING ROAD INTERSECTIONS

(75) Inventors: Michael Weiland, Gurnee, IL (US); Gregory Nyczak, Hinsdale, IL (US); William McDonough, Glen Ellyn, IL (US); Michael Tsengouras, Lake Villa, IL (US); David Shuman, Deer Park, IL (US); Paul Ford, Oak Park, IL (US)

(73) Assignee: HERE Global B.V., Veldhoven (NL)

( * ) Notice: Subject to any disclaimer, the term of this patent is extended or adjusted under 35 U.S.C. 154(b) by 820 days.

(21) Appl. No.: 10/465,890

(22) Filed: Jun. 19, 2003

(51) Int. Cl.
*G06F 19/00* (2011.01)
*G01C 21/26* (2006.01)

(52) U.S. Cl.
CPC ..................... *G01C 21/26* (2013.01)

(58) Field of Classification Search
USPC ......... 701/301, 302, 209, 208, 207, 206, 211, 701/202, 213, 1, 205, 408, 409, 410, 532, 701/533, 2; 340/995.1, 995.19, 988, 990, 340/995.2, 539.2; 707/1
See application file for complete search history.

(56) References Cited

U.S. PATENT DOCUMENTS

| | | | | |
|---|---|---|---|---|
| 5,902,350 A * | 5/1999 | Tamai et al. | ................. | 701/211 |
| 5,910,177 A * | 6/1999 | Zuber | ......................... | 701/202 |
| 6,018,697 A | 1/2000 | Morimoto et al. | ........... | 701/209 |
| 6,134,501 A | 10/2000 | Oumi | | |
| 6,188,957 B1 * | 2/2001 | Bechtolsheim et al. | ...... | 701/209 |
| 6,249,740 B1 | 6/2001 | Ito et al. | ........................ | 701/200 |
| 6,292,752 B1 | 9/2001 | Franke et al. | ................. | 701/300 |
| 6,385,536 B2 | 5/2002 | Kimura | | |
| 6,405,131 B1 | 6/2002 | Barton | | |
| 6,446,000 B2 | 9/2002 | Shimabara | | |
| 6,505,117 B1 * | 1/2003 | Ratert et al. | ................. | 701/209 |
| 6,510,382 B2 | 1/2003 | Wilson | .......................... | 701/208 |
| 6,526,348 B1 | 2/2003 | McDonough | | |
| 6,624,782 B2 | 9/2003 | Jocoy et al. | ..................... | 342/70 |
| 7,383,126 B2 | 6/2008 | Takahashi | | |

(Continued)

FOREIGN PATENT DOCUMENTS

| | | | | |
|---|---|---|---|---|
| EP | 1096229 | 5/2001 | ............. | G01C 21/26 |
| EP | 1 111 366 A | 6/2001 | ............. | G01C 21/26 |
| WO | WO 99/57516 | 11/1999 | ............. | C01C 21/20 |

OTHER PUBLICATIONS

Web pages, NEC Research Index (http://citeseer.ni.nec.com) paper entitled "Mining GPS Data to Augment Road Models", (1999) Rogers et al., 21 pages.

(Continued)

*Primary Examiner* — Ronnie Mancho
(74) *Attorney, Agent, or Firm* — Lempia Summerfield Katz LLC

(57) ABSTRACT

A method is disclosed for representing road intersections as data. A database includes intersection object data entities that represent physical road intersections. Each intersection object data entity includes a maneuver list that identifies each permissible transversal of the intersection from each lane by which the represented intersection can be entered to each lane from which the intersection can be exited from the associated lane by which the intersection can be entered. Each transversal in the maneuver list indicates an entry lane, an exit lane, the geometry of a vehicle path connecting the entry and exit lanes, and an indication of a level of confidence associated with the specified geometry. The database can be used by a system in a vehicle to provide a safety-related function. The database is compatible with navigation-related applications that use a different data model to provide navigation-related functions.

20 Claims, 9 Drawing Sheets

(56) References Cited

U.S. PATENT DOCUMENTS

| | | | |
|---|---|---|---|
| 7,502,685 B2 | 3/2009 | Nakamura | |
| 7,630,832 B2 | 12/2009 | Kim et al. | |
| 7,783,422 B2 | 8/2010 | Tanaka | |
| 8,068,982 B2 | 11/2011 | Takada | |
| 8,134,480 B2 | 3/2012 | Onome et al. | |
| 8,195,386 B2 | 6/2012 | Hu et al. | |
| 8,630,801 B2 | 1/2014 | Katzer | |
| 9,046,380 B2 | 6/2015 | Mori et al. | |
| 2001/0056326 A1* | 12/2001 | Kimura | 701/208 |
| 2002/0013659 A1* | 1/2002 | Kusama | 701/211 |
| 2002/0014979 A1 | 2/2002 | Wilson | 340/995 |
| 2002/0036584 A1* | 3/2002 | Jocoy et al. | 342/70 |
| 2002/0198694 A1 | 12/2002 | Yang et al. | 703/6 |
| 2003/0074131 A1 | 4/2003 | Barkowski et al. | 701/200 |
| 2003/0187578 A1* | 10/2003 | Nishira et al. | 701/301 |

OTHER PUBLICATIONS

Painter et al., U.S. Appl. No. 09/918,668, filed Jul. 31, 2002, entitled: Method for Representing Roads in a Geographic Database.

Fohl, Peter et al., A Non-Planar, Lane-Based Navigable Data Model for ITS, National Center for Geographic Information and Analysis (NCGIA), XP-002428165, pp. 7B17-7B29 (Aug. 1996).

EPA 03257191.1 European Search Report, dated Jun. 21, 2007.

* cited by examiner

METHOD AND APPARATUS FOR REPRESENTING ROAD INTERSECTIONS

BACKGROUND OF THE INVENTION

The present invention relates to methods for representing roads as data in a database, and more particularly, the present invention relates to methods for representing road intersections in a database used for vehicle driver assistance or safety systems.

Vehicle driver assistance systems, such as systems for obstacle warning and avoidance, lane departure warning, collision warning and avoidance, adaptive cruise control, adaptive transmission operation, automatic headlight aiming, and so on, have been developed to improve the safety and convenience of vehicle operation. These systems include technologies that augment a driver's ability to operate a vehicle safely and efficiently. Some of these systems include equipment that senses features around the vehicle. In addition, some of these systems use data that models the road network upon which the vehicle is traveling. Based on the sensed features and the model of the road network, the driver assistance and safety systems may provide warnings or otherwise modify operation of the vehicle to improve safety or convenience.

Data representations of the road network have also been used for various other purposes. For example, data representations of the road network are used in vehicle navigation systems to provide navigation-related features, such, as route calculation, route guidance, map display and destination selection. In some databases used by navigation systems, each road segment is represented by one or more data records or entities. Associated with each data record or entity are attributes that describe various features of the represented road segment. Some of the features of a road segment that are represented by such data records include the location of the road segment, the locations of road intersections, the name of the road segment, the speed limit (or speed category) along the road segment, the number of lanes along the road segment, any highway designations of the road segment, the type of road surface (e.g., paved, unpaved, gravel), the presence of any lane dividers, etc.

The ways that roads are represented in databases used in navigation systems are useful. However, the ways that roads are represented in databases used for navigation purposes may not be suitable for driver assistance and safety systems. For example, for navigation purposes, it is important to have data that indicate the speed limits along roads, the names of roads, the address ranges along road segments, and how much time it might take to cross a road intersection. For navigation purposes, the exact path that a vehicle takes across an intersection is not necessarily important. However, for driver assistance systems, such as obstacle avoidance or warning systems, the paths that vehicles take through intersections may be needed to provide a warning or take another action.

Accordingly, it is an objective to provide a data model for road intersections that can be used by driver assistance systems.

It is another objective to provide a data model for road intersections that is compatible with various uses of the data.

SUMMARY OF THE INVENTION

To address these and other objectives, the present invention includes a method and system for representing road intersections as data. A database includes intersection object data entities that represent physical road intersections. Each intersection object data entity includes a maneuver list that identifies each permissible transversal of the intersection from each lane by which the represented intersection can be entered to each lane from which the intersection can be exited from the associated lane by which the intersection can be entered. Each transversal in the maneuver list indicates an entry lane, an exit lane, the geometry of a vehicle path connecting the entry and exit lanes, and an indication of a level of confidence associated with the specified geometry. The database can be used by a system in a vehicle to provide a safety-related function. The database is compatible with navigation-related applications that use a different data model to provide navigation-related functions.

DETAILED DESCRIPTION OF THE PRESENTLY PREFERRED EMBODIMENTS

A first embodiment relates to a method for representing road intersections in a database that contains data that represent a road network in a geographic region. The database is used by a system in a vehicle that provides safety or convenience features to the vehicle driver.

Figure 1:
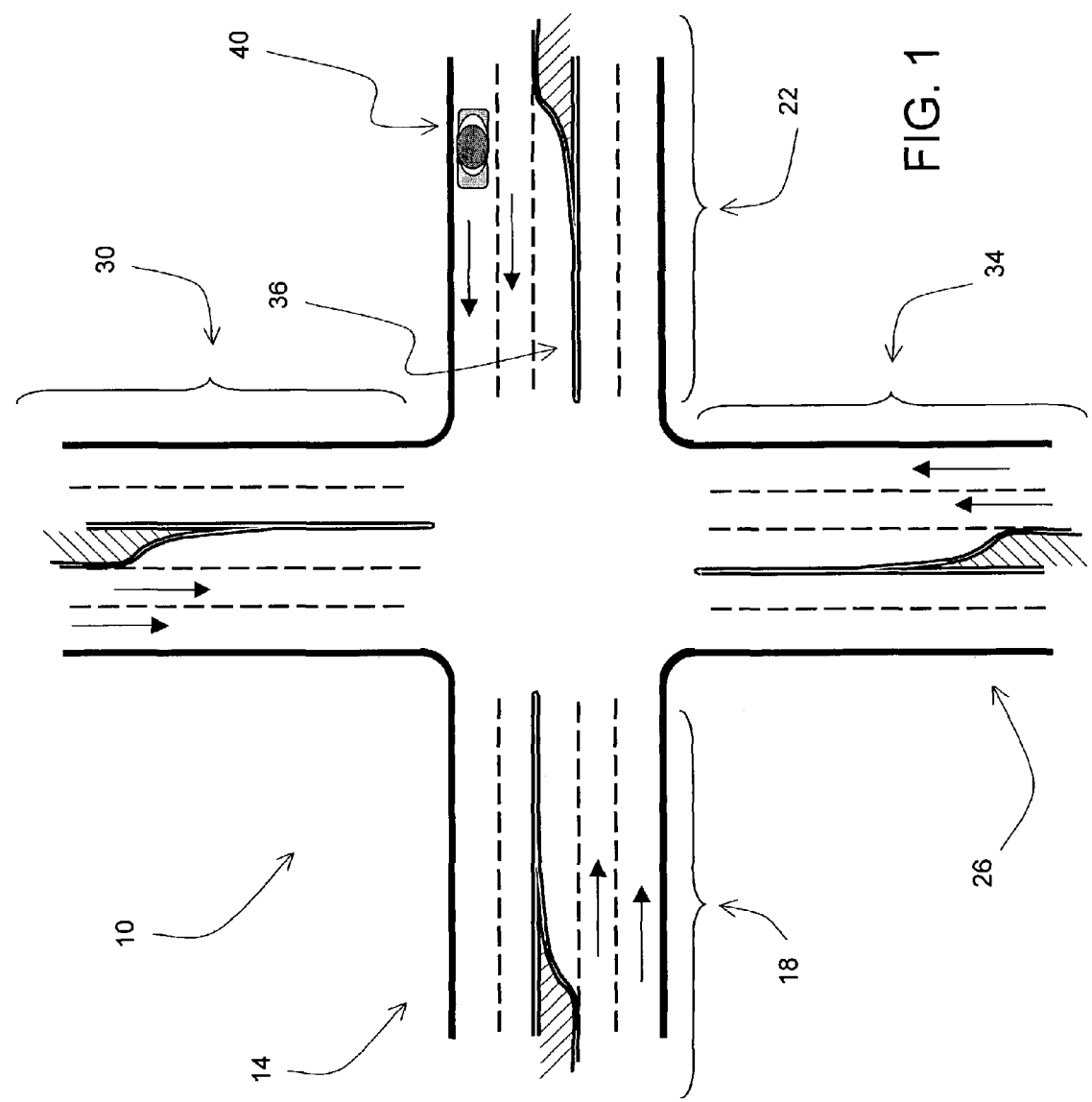
FIG. 1 is an illustration of an intersection.

FIG. 1 shows an exemplary intersection 10 located in a geographic region. The intersection 10 is a location at which two roads meet at the same level. A first road 14 is comprised of segments 18 and 22. A second road 26 is comprised of segments 30 and 34. These roads 14 and 26 each have two lanes in each direction. Each segment also has a left turn lane (e.g., 36). The left turn lanes do not extend along the lengths of the segments. Instead, each left turn lane extends only part of the way along a segment. The intersection and roads shown in FIG. 1 are representative of many similar intersections and roads located in the geographic region.

Figure 2:
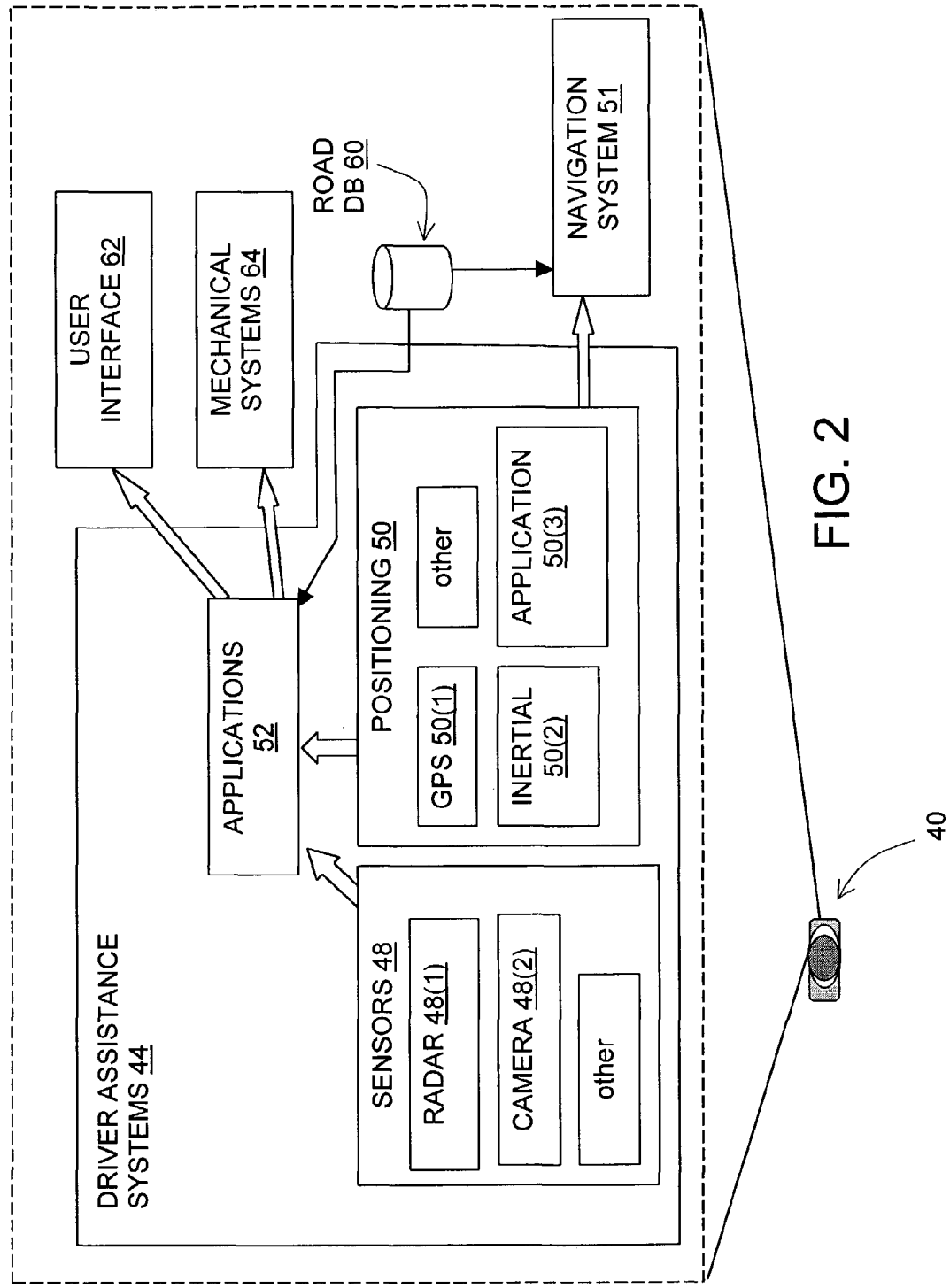
FIG. 2 is a block diagram that shows components of driver assistance systems in the vehicle shown in FIG. 1.

A vehicle 40 travels on one of the roads. Although only one vehicle is shown in FIG. 1, the vehicle 40 is representative of many vehicles, which are similarly equipped, that travel on the roads in the geographic region. Referring to FIG. 2, the vehicle 40 includes one or more driver assistance or safety systems 44. The driver assistance systems 44 are systems that make operation of the vehicle safer or more convenient. The driver assistance systems 44 may include an obstacle warning system, a lane departure system, an adaptive cruise control system, and/or a collision avoidance system. The driver assistance systems 44 may include other systems in addition to, or instead of, any of these systems.

The driver assistance systems 44 are combinations of hardware and software components. The driver assistance systems 44 use sensors 48. Various different types of sensors may be used. In general, the sensors 48 measure (or are responsive to) some property, parameter, attribute, or characteristic of the vehicle or the environment around the vehicle. For example, the sensors 48 may include a radar system 48(1), a camera system 48(2), or other sensors.

The vehicle 40 includes a positioning system 50. In the embodiment shown in FIG. 2, the positioning system 50 is part of the driver assistance systems 44. Alternatively, the positioning system 50 may be part of another system in the vehicle 40, such as a navigation system 51. According to another embodiment, the positioning system 50 may be a standalone system in the vehicle. The positioning system 50 is a combination of hardware and software components. For example, the positioning system 50 may include a GPS or DGPS unit 50(1), one or more inertial sensors 50(2), such as a gyroscope or accelerometer, differential wheel sensors, or other types of equipment.

In a present embodiment, the driver assistance systems 44 include or use a road database 60. The road database 60 includes a data representation of the road network in the geographic region in which the vehicle 40 is traveling. In a present embodiment, the road database 60 includes data that indicate the positions of the roads, the intersections of roads, and the locations of lanes, as well as other information.

The road database 60 is used by an application 50(3) in the positioning system 50 to determine the position of the vehicle 40 relative to the road network. More specifically, the positioning application 50(3) uses the data in the road database 60 and outputs from other positioning system components, such as the GPS unit 50(1) and sensors 50(2), to determine the position of the vehicle along a road segment represented by data in the road database 60, the position of the vehicle relative to the lanes of the represented road segment, the direction and/or bearing of the vehicle along the represented road segment, and possibly other parameters.

The driver assistance systems 44 include driver assistance applications 52. The driver assistance applications 52 are programs that implement the functions of the driver assistance systems 44. The driver assistance applications 52 receive outputs from the sensors 48. The driver assistance applications 52 also use data from the road database 60. The driver assistance applications 52 may also receive other information. Based on the data received from the sensors 48, the data obtained from the road database 60, and possibly other information, the driver assistance applications 52 evaluate whether a warning or other action should be provided. The driver assistance systems 44 provide the safety or convenience features via a user interface 62 of the vehicle or by controlling a vehicle mechanical system 64. For example, a curve warning application may provide an audible alarm via speakers (i.e., part of the user interface 62 in the vehicle) or an obstacle avoidance application may engage the vehicle's brakes (i.e., one of the mechanical systems 64 in the vehicle).

Figure 3:
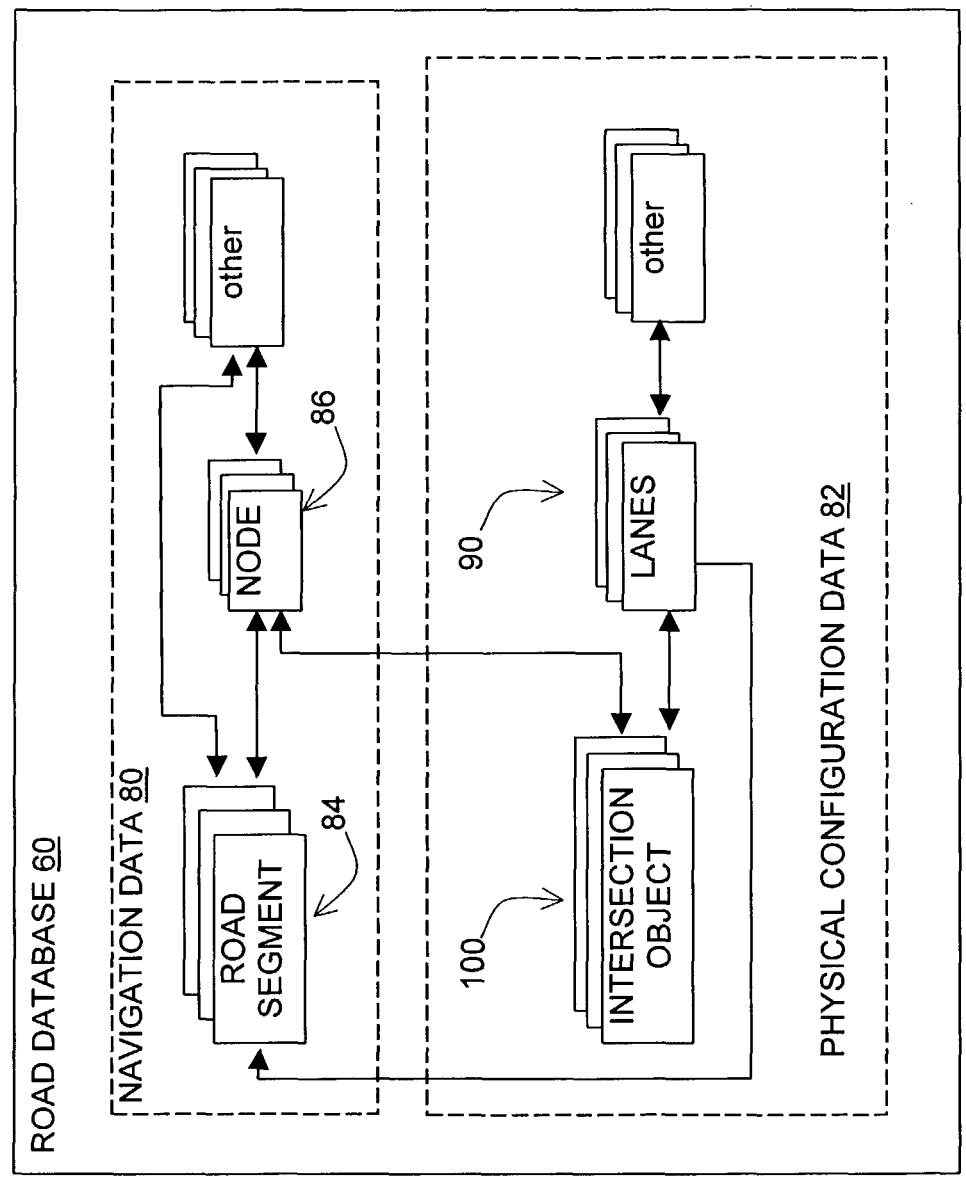
FIG. 3 is a diagram that shows components of an embodiment of the road database of FIG. 2.

FIG. 3 shows components of the road database 60. In the embodiment shown in FIG. 3, roads are represented in different ways. These different ways relate to how the road data are used. The different ways that the road data are being used affect which aspects of a road are represented. For example, in FIG. 3, the road database 60 includes navigation data 80 and physical configuration data 82. (In addition to navigation data 80 and physical configuration data 82, the road database 60 may include other collections of data that represent the roads in other ways.) In FIG. 3, the navigation data 80 and the physical configuration data 82 are indicated as being separate collections that are related to each other. However, in alternative embodiments, these different ways of representing roads may be included in a single collection of data.

The navigation data 80 are used by navigation-related applications, such as route calculation, route guidance, destination selection, and map display. The navigation data 80 represent the aspects of roads that are important for these functions, such as which roads connect to each other, road names, speed limits along roads, address ranges along roads, and so on.

In the embodiment of FIG. 3, the navigation data 80 include data that represent road segments 84 and data that represent nodes 86. Each discrete segment of each road is represented by a separate road segment data record. A road segment is a portion of a if road between adjacent intersections or between a dead end and an adjacent intersection. A road segment may also be defined that ends at a point along a road between adjacent intersections. The navigation data 80 in the road database 60 may also include data records that represent aggregations of individual road segments.

A node refers to an endpoint of a road segment. For example, each road segment has two endpoints. Each endpoint of a road segment is represented with a node data record in the road database 60.

As mentioned above, the road network database 60 also includes physical configuration data 82. The physical configuration data 82 are used by the driver assistance systems (44 in FIG. 2) for safety and convenient features, such as obstacle warning, curve warning, and so on.

The physical configuration data 82 provides a representation of the road network that is different from the representation provided by the navigation data 80. For example, the physical configuration data 82 represent detailed aspects of the road lanes (including lane configuration), detailed aspects of the intersections, traffic signals (and placement thereof), shoulder locations, and other detailed physical features relating to roads. Where roads intersect, the physical configuration data 82 models the relationships between the lanes that bring traffic into the intersection and the lanes that take traffic out. Modeling these relationships involves several considerations. For example, simply extending road lanes into an intersection area would lead to many lane-to-lane crossings that would imply connectivity between crossing lanes that may not be present in reality. In addition, if connectivity between lanes does exist, a simple extension of the lanes into the intersection area might indicate the point of the connectivity in the wrong place. For these reasons, as well as for other reasons, the physical configuration data 82 in the road database 60 includes a road lane data model that has road lanes that lead up to, but not through, intersections.

The following considerations are addressed by the intersection model used in the physical configuration data 82 in the road database 60:

(1) The road-to-road maneuvers that take place at an intersection, between specific lanes on the incoming and outgoing lanes, are described. In particular, a driver assistance application in a vehicle heading into and through an intersection—is provided with the information needed to predict a likely vehicle location at some time or distance offset from the current vehicle position.

(2) The fact that some maneuvers through an intersection have predictable vehicle paths, whereas other maneuvers through the intersection do not have a predictable path, is accommodated.

(3) The interaction between traffic signals and traffic at the intersection is modeled. This modeling accounts for the case in which some traffic lanes or maneuvers are controlled by different aspects of the traffic signals (e.g., a left-turn signal). This modeling also accounts for the case in which some maneuvers at an intersections are governed by traffic signals and other maneuvers at the same intersection are not (e.g., a "Yield" on a right turn).

(4) Normal intersections are distinguished from special types of intersections such as roundabouts and railroad crossings that pose special considerations for driver assistance systems.

To support compatibility with navigation-related applications, the representations of intersections in the physical configuration data 82 are associated with the node data that represent the same corresponding actual physical intersections in the navigation data 80. Some actual physical intersections are represented by more than one node data record in the navigation data 80. For example, an intersection between a multiple-digitized road and a single digitized road may be represented by two or more node records in the navigation data 80. In such cases, the representation of an intersection in the physical configuration data is associated with all the node records in the navigation data that represent the same intersection.

Another consideration associated with the representation of an intersection in the physical configuration data 82 is that the representation should be reliably derivable from practical source materials. For example, the representation of an intersection in the physical configuration data 82 should be derivable from vehicle path data obtained from driving, overhead aerial imagery, or probe vehicle ("floating car") data. The above considerations are addressed in an embodiment of the physical configuration data disclosed herein. Referring again to FIG. 3, the physical configuration data 82 of the road database 60 includes lane data entities (or records) 90 and intersection objects 100, as well as other data entities.

The lane data entities 90 identify each lane of each road in the geographic region. The lane data entity 90 includes a data entity ID that uniquely identifies the lane data record in the road database 60. Each lane data entity 90 identifies which road the lane is part of (e.g., by reference to a road segment ID in the navigation data 90), the location of the lane (e.g., the starting location, the ending location, and the shape of the lane between the starting location and the ending location), and what is adjacent to the lane. The lane data entity may include other information.

An intersection object 100 is a data entity in the road database 60. In a present embodiment, the intersection object 100 does not define shape or determine a position. Instead, the intersection object 100 defines the logical associations between the other data entities that represent the various physical components of the actual intersection. An intersection object 100 is defined for each road-to-road intersection represented in the road database 60.

Figure 4:
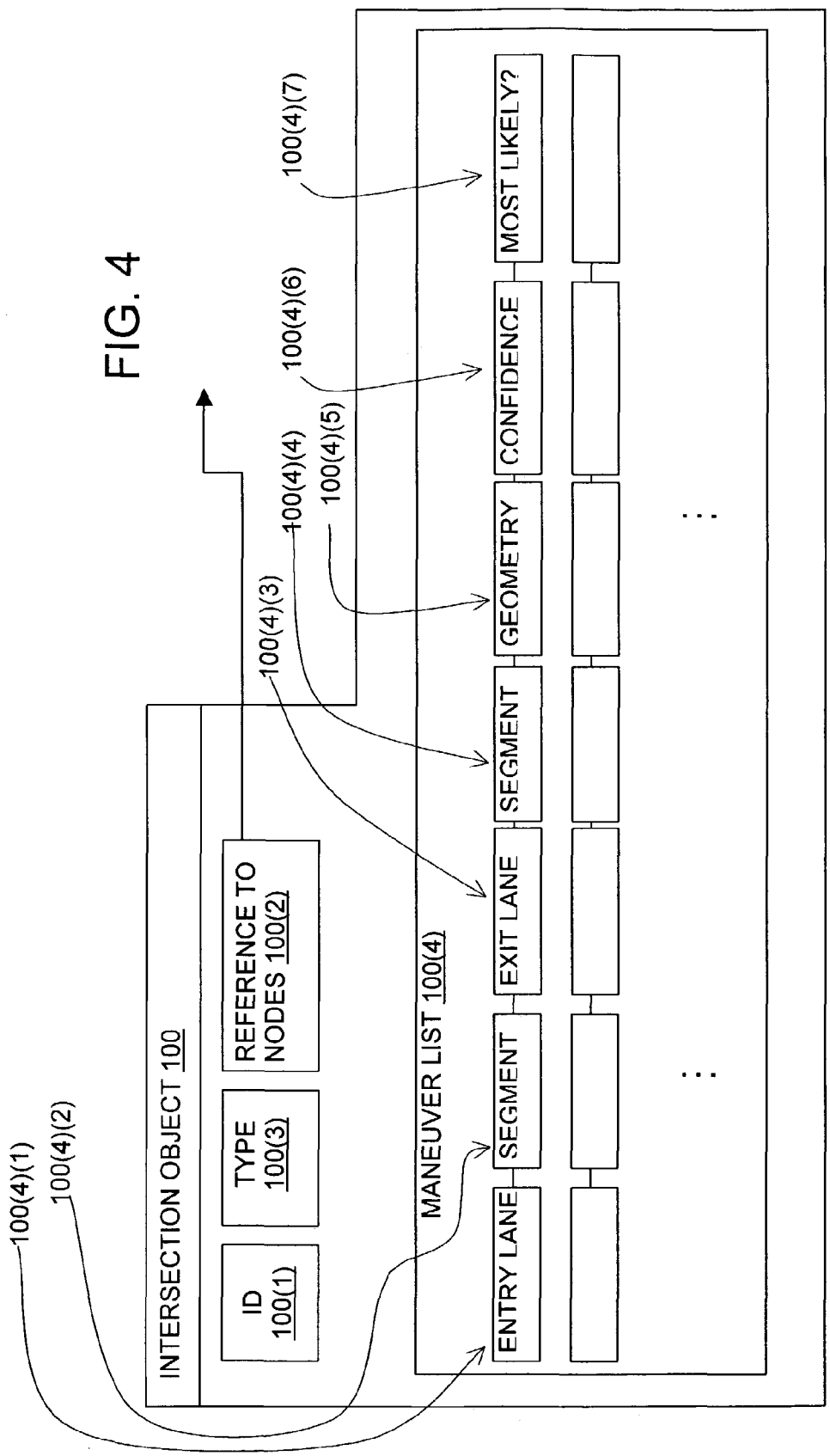
FIG. 4 is a diagram that shows components of one of the intersection objects shown in FIG. 3.

Referring to FIG. 4, each intersection object 100 is identified by a unique ID, (e.g., an intersection object ID 100(1)).

Each intersection objection 100 is logically associated with (i.e., references) one or more of the nodes (by node ID) that represent the intersection in the navigation data 80. Accordingly, each intersection objection 100 includes a reference 100(2) to one or more node IDs. By referencing the node IDs that represent the intersection in the navigation data 80, the intersection object 100 associates the representation of the physical configuration of the road with the navigation representation of the road network. Each intersection object 100 includes an attribute 100(3) that identifies the intersection type. The intersection type attribute 100(3) identifies the represented intersection as "standard," "roundabout," or "railroad crossing." Most represented intersections are "standard." An intersection like the one in FIG. 1 (i.e., intersection 10) would be represented as a "standard" intersection. An intersection like the one in FIG. 5 (i.e., intersection 102) would be represented as a "roundabout" intersection. An intersection like the one in FIG. 6 (i.e., intersection 104) would be represented as a "railroad crossing" intersection. Intersections labeled as "roundabout" or "railroad crossing" are discussed below.

Figure 7:
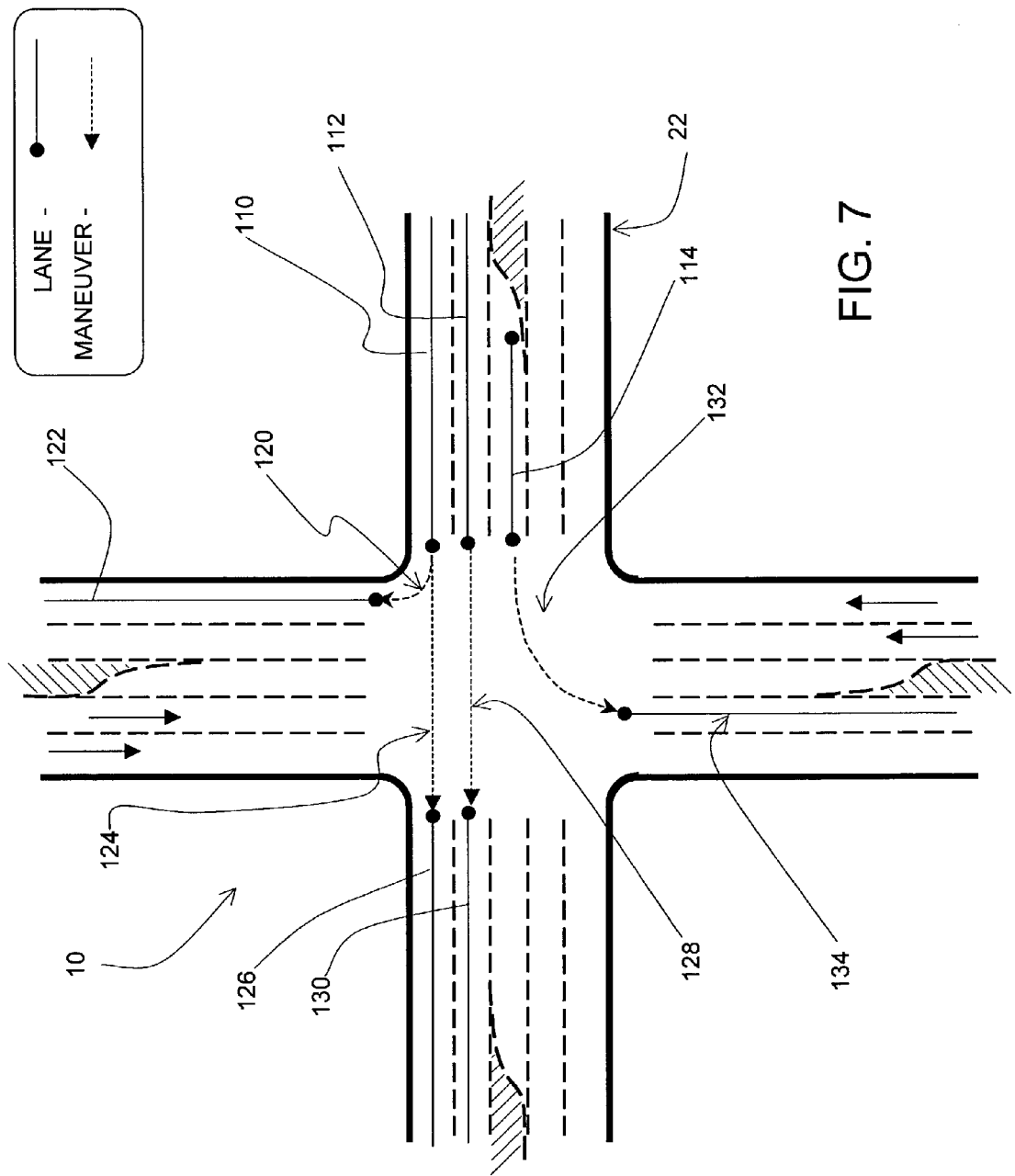
FIG. 7 shows the intersection depicted in FIG. 1 with several transversals of the intersection from some of the lanes illustrated.

Referring to FIG. 4, the intersection object 100 includes a maneuver list 100(4). The maneuver list 100(4) includes entries for all the reasonable, legal transversals from a lane entering the represented intersection to a lane leaving the represented intersection. For example, referring to FIG. 7, the maneuvers from three of the lanes 110, 112 and 114 entering the intersection 10 are shown. The lane 110 that enters the intersection 10 has one maneuver 120 onto the lane 122 and another maneuver 124 onto the lane 126. The lane 112 that enters the intersection 10 has only one maneuver 128, i.e., onto the lane 130. Likewise, the lane 114 that enters the intersection 10 has one maneuver 132 onto the lane 134. (For the sake of clarity, FIG. 7 illustrates the maneuvers from only the three lanes 110, 112, and 114 that enter the intersection 10 from the road segment 22. It is understood that the intersection object that represents the intersection 10 would include all the maneuvers from all the lanes from all the rest of the road segments that enter the intersection.)

Each entry in the maneuver list 100(4) includes several kinds of data about the represented transversal. Referring again to FIG. 4, an entry in the maneuver list identifies the entry lane 100(4)(1) and the exit lane 100(4)(3) for the maneuver. The entry lane and the exit lane are identified by lane data entity IDs. In the embodiment of FIG. 4, the entry in the maneuver list 100(4) also indicates the segment of which the entry lane is a part 100(4)(2) and the segment of which the exit lane is a part 100(4)(4). In this embodiment, these segments are identified by road segment IDs (i.e., references to the road segment records in the navigation data 80).

An entry in the maneuver list 100(4) also identifies the geometry 100(4)(5) of the maneuver. At a minimum, the geometry is identified as a straight line between the end of the incoming lane 100(4)(1) and the start of the outgoing lane 100(4)(3). If the entry and exit lanes physically meet (such as in the intersection 136 illustrated in FIG. 8), the geometry 100(4)(5) indicates the single point where the entry end exit lanes physically meet. If the travel path of a vehicle between the entry lane and the exit lane is curved, this geometry 100(4)(5) may indicate this path by defining a parametric curve.

An entry in the maneuver list 100(4) also includes a confidence indication 100(4)(6). The confidence indication 100 (4)(6) relates to the maneuver's geometry 100(4)(5). The confidence indication 100(4)(6) indicates the likelihood that the geometry of the maneuver accurately predicts or represents a vehicle path. For example, it is possible that a basic straight-line connection between and entry lane and an exit lane is highly indicative of actual vehicle paths, such as when going straight through an intersection. It is also possible that even for a turning maneuver, the vehicle path is highly predictable and well known. However, it is also possible that the vehicle path geometry through a maneuver is variable or even unknown.

Figure 9:
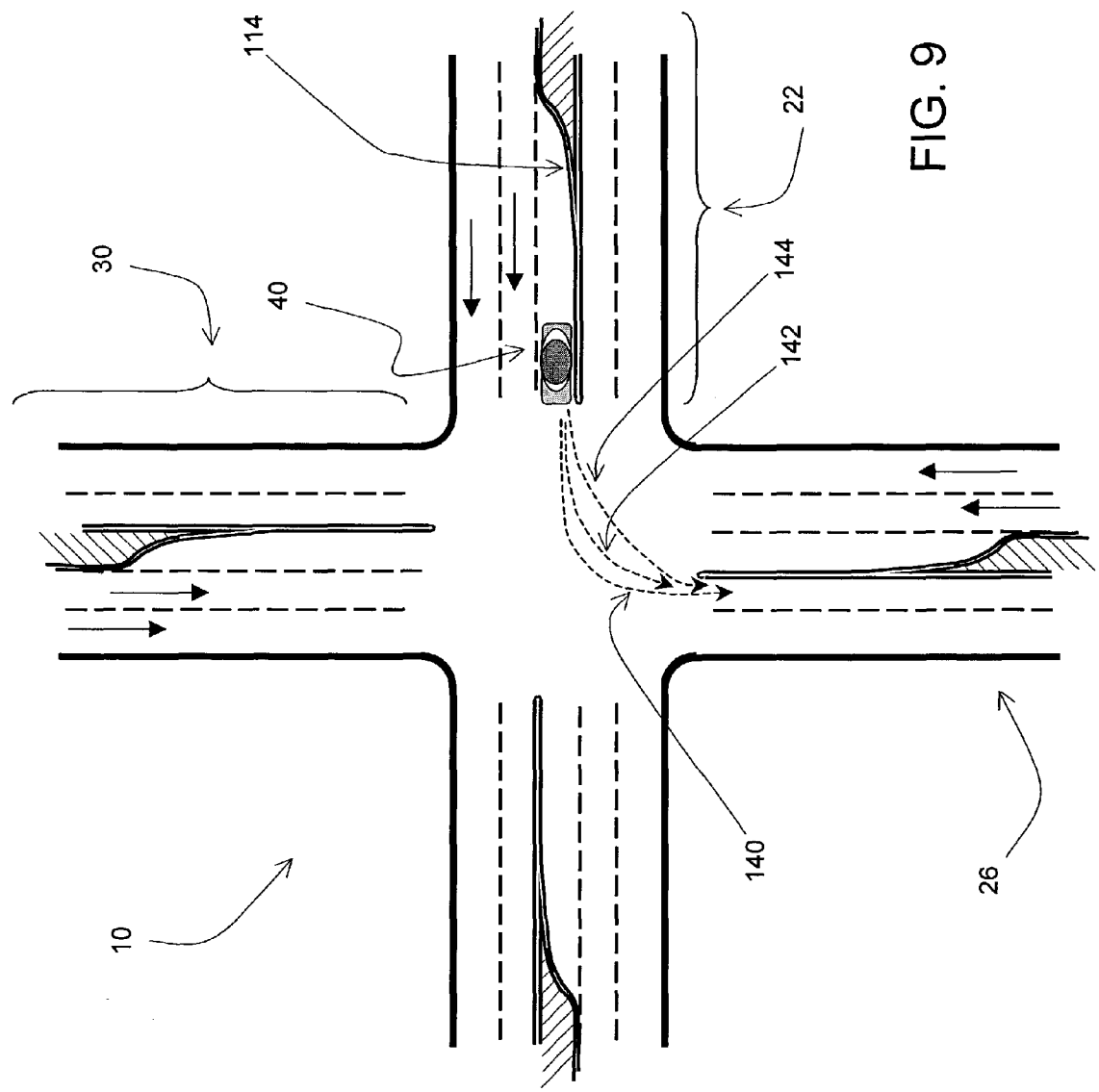
FIG. 9 shows the intersection depicted in FIG. 1 with several valid vehicle paths for a transversal of the intersection from one lane to another, illustrating that the transversal has a low confidence rating.

FIG. 9 shows several possible paths, labeled 140, 142 and 144, that a vehicle could legally take when traveling from the left turn lane 114 on the road segment 22 onto the lane 134 on the road segment 34. Each of these several possible paths is a legal path. The entry for this transversal in the maneuver list 100(4) in the intersection object 100 that represents this intersection would include the geometry for only one of these paths. In addition, the maneuver entry for this transversal would have a low confidence indication 100(4)(6), i.e., meaning that the probability of the vehicle actually being on the path indicated by the geometry 100(4)(5) is relatively low. This confidence indication 100(4)(6) is used by driver assistance applications (52 in FIG. 2) to determine if a vehicle's deviation from the maneuver geometry is of concern.

In a present embodiment, the confidence indication 100(4)(6) is set to one of several values. These values include the following:

(1) None—When the confidence indication 100(4)(6) is set to "None", the geometry 100(4)(5) is set to indicate a straight-line connection. However, this straight line geometry is not intended to represent an actual vehicle path.

Figure 8:
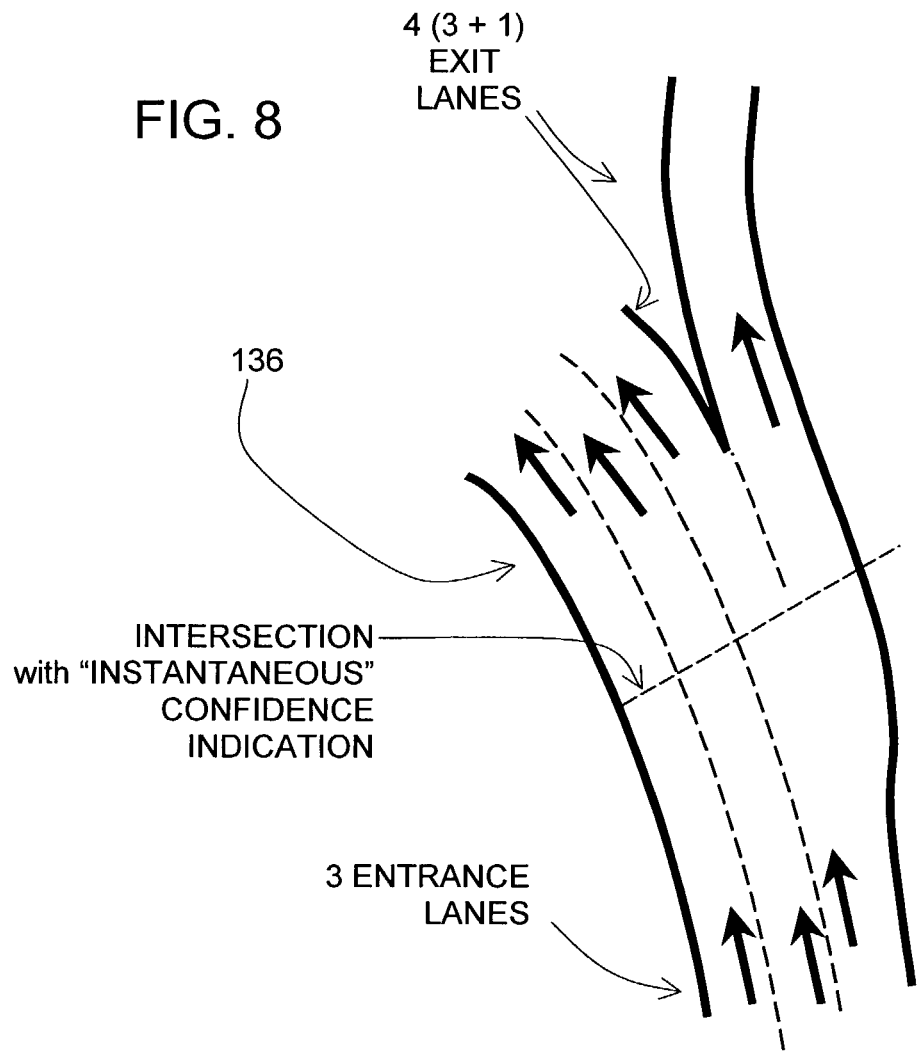
FIG. 8 shows an intersection in which the transversals are instantaneous.

(2) Instantaneous—When the confidence indication 100(4)(6) is set to "instantaneous", the incoming and outgoing lanes meet with no gap or cross-traffic. An example of an intersection with no gap between the incoming and outgoing lanes and therefore an instantaneous confidence indication, is shown in FIG. 8.

(3) Actual, high confidence—The confidence indication 100(4)(6) is set to "Actual, high confidence" when the geometry is based on accurate sources such as probe vehicle data with small statistical variance.

(4) Actual, variable—The confidence indication 100(4)(6) is set to "Actual, variable" when the geometry is based on sources that indicate a higher statistical variance.

(5) Cartooned, high confidence—The confidence indication 100(4)(6) is set to "Cartooned, high confidence" when the geometry is typically, a straight-line connection for a straight-through maneuver between lanes that line up well.

(6) Cartooned, medium confidence—The confidence indication 100(4)(6) is set to "Cartooned, medium confidence" when the geometry is digitized from tire artifacts or other evidence that does not provide a statistical variance.

(7) Cartooned, low confidence—The confidence indication 100(4)(6) is set to "Cartooned, low confidence" when the geometry is digitized logically but without supporting evidence.

An entry in the maneuver list 100(4) also includes an indication 100(4)(7) whether the maneuver is the "most likely path" for traffic coming from the associated incoming lane. This indication is meaningful when two or more maneuvers are possible from the same lane. This will help a driver assistance application (52 in FIG. 2) determine a likely lane-level position.

An entry in the maneuver list 100(4) also includes an indication 100(4)(8) whether traffic signals are present at the intersection and an indication as to which particular signal(s) govern traffic for this maneuver. It is possible that all maneuvers for a particular incoming lane will share the same signals, but it is also possible that maneuvers for different incoming lanes will be governed by different traffic signals.

In addition to the information indicated above, the intersection object may include additional data.

Roundabouts

Figure 5:
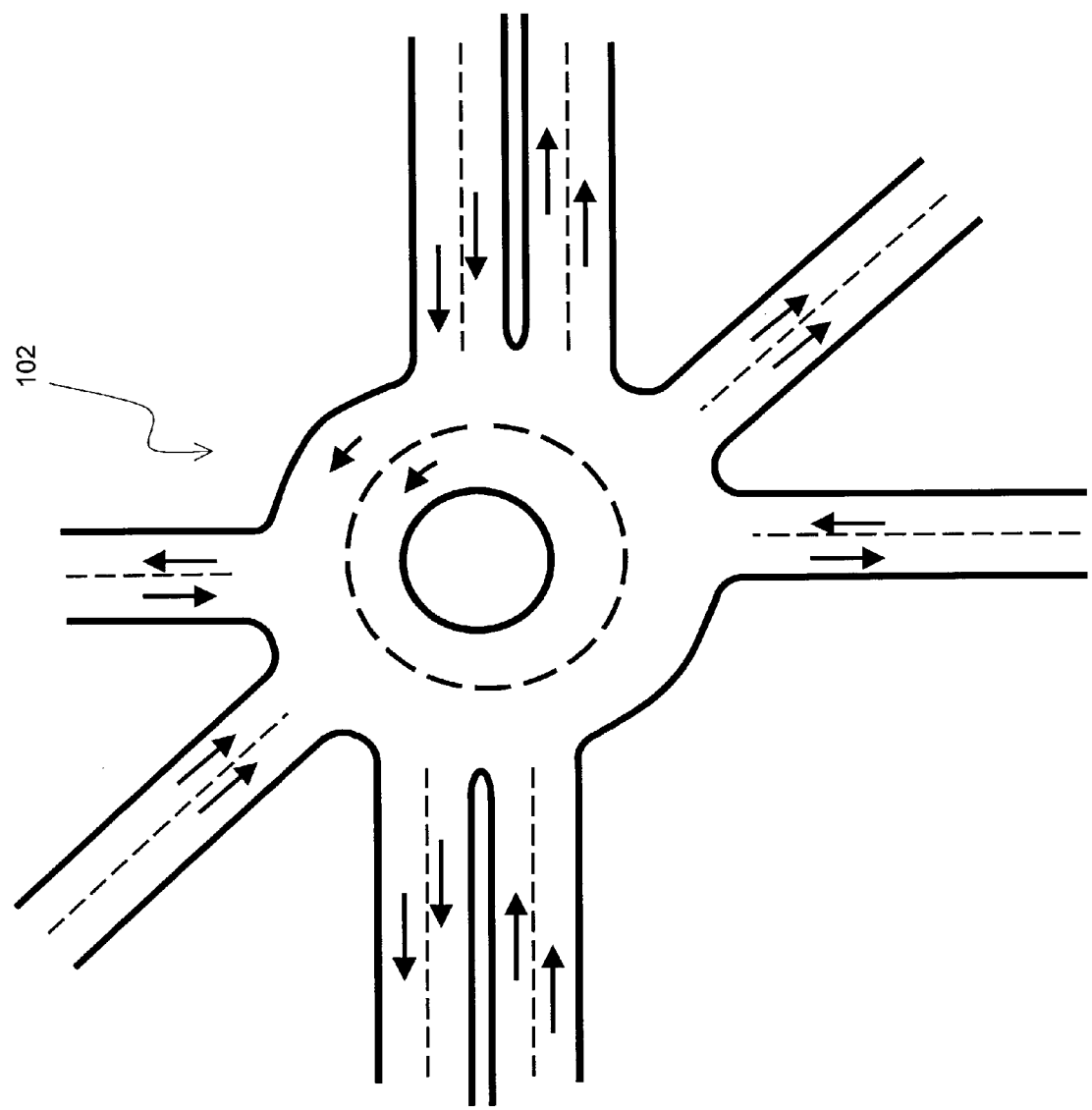
FIG. 5 is an illustration of a roundabout type of intersection.

As mentioned above, an intersection objection 100 includes an attribute that indicates an intersection type. One of the intersection types is "roundabout." An example of a roundabout (also sometimes referred to as a traffic circle) is shown in FIG. 5. Having information that indicates that an intersection is a roundabout is useful for driver assistance applications that involve sensing the path ahead of a vehicle. When a vehicle enters a roundabout intersection, it follows a circular path in a single rotational direction around a center island of the roundabout. Thus, the vehicle entering a roundabout from an entry lane may actually travel in a direction away from the exit lane as it travels around the roundabout. A driver assistance application that senses the path ahead of the vehicle uses the information that an intersection is a roundabout to account for the vehicle path traveling around the roundabout.

Railroad Crossings

Figure 6:
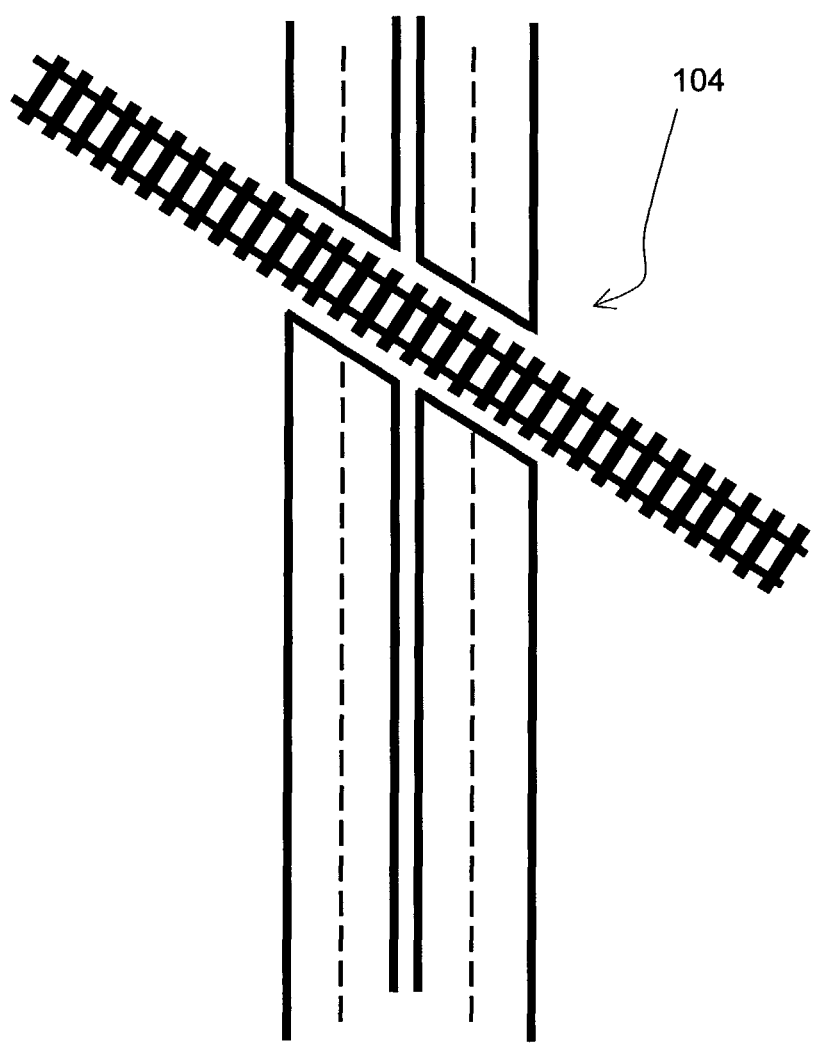
FIG. 6 is an illustration of a railroad crossing type of intersection.

As mentioned above, another type of intersection is a "railroad crossing." FIG. 6 shows an example of a "railroad crossing" intersection. Note that an intersection indicated to be a "railroad crossing" is not necessarily an intersection of actual roads. However, in a present embodiment, railroad crossings are represented by intersection objects, in part because of the presence of metal rails that may be detected by in-vehicle sensors.

A railroad crossing is similar to a road crossing, in that the lanes may not be well defined through the crossing. A railroad crossing may present radar targets (not only trains but also metal rails), and may have marked stopping positions.

Operation

As mentioned above, a vehicle that has a driver assistance system uses a road database that has road physical configuration data to provide safety or convenience features. On a continuous basis, a position of the vehicle relative to the road network is determined. This function is performed by a positioning system in the vehicle. Using the data in intersection objects, the driver assistance applications can predict the path ahead of a vehicle as the vehicle travels through intersections. This allows the driver assistance systems to provide safety and convenience features as the vehicle crosses an intersection.

It is intended that the foregoing detailed description be regarded as illustrative rather than limiting and that it is understood that the following claims including all equivalents are intended to define the scope of the invention.

We claim:

1. A method for representing intersections with a road database comprising:

storing in the road database intersection object data entities that represent physical road intersections, wherein each intersection object data entity includes a maneuver list that contains entries that identify all permissible traversals of the intersection to all lanes from which the intersection can be legally exited from each one of all the lanes by which the intersection can be entered, wherein each entry in the maneuver list indicates a lane into the intersection;

a lane out of the intersection; and a geometry indicating a vehicle path connecting the lane into the intersection and the lane out of the intersection, and wherein at least some of the physical road intersections represented in the road database have a configuration in which multiple lanes exiting an intersection are legally accessible from a single lane entering the intersection and for such intersections the maneuver list identifies the permissible traversals to said multiple lanes from said single lane.

2. The method of claim 1 wherein each intersection object further comprises data that indicate an intersection type.

3. The method of claim 2 wherein the intersection type is one of: standard, roundabout and railroad crossing.

4. The method of claim 1 wherein at least some entries in the maneuver list in the intersection object indicate whether the represented traversal is more likely than all the other traversals of the intersection from the lane that enters the represented intersection.

5. The method of claim 1 wherein each entry in the maneuver list further includes data that indicate a level of confidence associated with the geometry.

6. The method of claim 5 wherein the level of confidence includes: high confidence and low confidence.

7. The method of claim 5 wherein the level of confidence indicates when a represented traversal is instantaneous.

8. The method of claim 5 wherein the level of confidence for an entry indicates one of:
   none, when the geometry indicates a straight-line connection, but is not intended to represent an actual vehicle path;
   instantaneous, when the lane into the intersection and the lane out of the intersection meet with no gap;
   actual, high confidence, when the geometry is based on accurate sources;
   actual, variable, when the geometry is based on sources that indicate a relatively high statistical variance;
   cartooned, high confidence, when the geometry is for a straight-through maneuver between lanes that line up well;
   cartooned, medium confidence, when the geometry is digitized from sources that do not provide a statistical variance; and
   cartooned, low confidence, when the geometry is digitized logically but without supporting evidence.

9. The method of claim 1 wherein each intersection object further comprises:
   a reference to at least one node data entity that represents the intersection for navigation-related purposes.

10. The method of claim 9 wherein the node data entity is used by a navigation application to provide navigation-related features.

11. A database that models roads, wherein the database is stored on a computer-readable medium, the database comprising:
    data entities that represent lanes of road segments, including data indicating physical configuration properties of the lanes, including locations of the lanes and which roads the lanes are associated with; and
    intersection object data entities that represent physical configuration properties of intersections, wherein each intersection object data entity includes a maneuver list that identifies all permissible traversals of a represented intersection to all lanes from which the intersection can be exited from each one of all the lanes by which the intersection can be entered, and
    wherein at least some of the intersections represented in the database have a configuration in which multiple lanes exiting an intersection are legally accessible from a single lane entering the intersection and for such intersections the maneuver list identifies the permissible traversals to said multiple lanes from said single lane.

12. The database of claim 11 further comprising:
    data entities that represent intersections of roads for navigation-related purposes,
    wherein the intersection object data entities refer to those data entities that represent intersections of roads for navigation-related purposes that represent common intersections.

13. The database of claim 12 further comprising:
    data entities that represent road segments for navigation-related purposes.

14. The database of claim 11 wherein at least some intersection object data entities include data that indicate an intersection type.

15. The database of claim 14 wherein the intersection type is one of: standard, roundabout and railroad crossing.

16. The database of claim 11 wherein at least some traversals from a given lane in the maneuver list in an intersection object are indicated to be more likely than others.

17. The database of claim 11 wherein data indicating a geometry is associated with at least some of the traversals in the maneuver list, wherein the data indicating a geometry indicates a shape of a vehicle path along the represented traversal.

18. The database of claim 17 wherein a level of confidence is associated with at least some of the data indicating a geometry.

19. The database of claim 18 wherein the level of confidence indicates when a represented traversal is instantaneous.

20. The database of claim 18 wherein the level of confidence indicates one of:
    none, when the geometry indicates a straight-line connection, but is not intended to represent an actual vehicle path;
    instantaneous, when the lane into the intersection and the lane out of the intersection meet with no gap;
    actual, high confidence, when the geometry is based on accurate sources;
    actual, variable, when the geometry is based on sources that indicate a relatively high statistical variance;
    cartooned, high confidence, when the geometry is for a straight-through maneuver between lanes that line up well;
    cartooned, medium confidence, when the geometry is digitized from sources that do not provide a statistical variance; and
    cartooned, low confidence, when the geometry is digitized logically but without supporting evidence.

* * * * *